US010803457B2

(12) United States Patent
Potts

(10) Patent No.: US 10,803,457 B2
(45) Date of Patent: Oct. 13, 2020

(54) SYSTEM FOR COORDINATING ACCESS TO MULTIPLE ACCOUNTS USING A SINGLE ACCESS CARD

(71) Applicant: Craig Potts, Scottsdale, AZ (US)

(72) Inventor: Craig Potts, Scottsdale, AZ (US)

( * ) Notice: Subject to any disclaimer, the term of this patent is extended or adjusted under 35 U.S.C. 154(b) by 248 days.

(21) Appl. No.: 15/655,599

(22) Filed: Jul. 20, 2017

(65) Prior Publication Data

US 2018/0025355 A1 Jan. 25, 2018

Related U.S. Application Data

(60) Provisional application No. 62/395,661, filed on Sep. 16, 2016, provisional application No. 62/364,483, filed on Jul. 20, 2016.

(51) Int. Cl.
| | |
|---|---|
| *G06Q 20/40* | (2012.01) |
| *G06Q 30/02* | (2012.01) |
| *G06Q 20/24* | (2012.01) |
| *G06Q 20/34* | (2012.01) |

(52) U.S. Cl.
CPC ............ *G06Q 20/40* (2013.01); *G06Q 20/24* (2013.01); *G06Q 20/3572* (2013.01); *G06Q 30/0215* (2013.01); *G06Q 30/0229* (2013.01)

(58) Field of Classification Search
CPC ........ G06F 17/60; G06Q 20/02; G06Q 20/10; G06Q 20/341
See application file for complete search history.

(56) References Cited

U.S. PATENT DOCUMENTS

| | | | | | |
|---|---|---|---|---|---|
| 4,305,059 | A | * | 12/1981 | Benton | G07F 7/0866 235/379 |
| 4,341,951 | A | * | 7/1982 | Benton | G06Q 20/10 235/379 |
| 4,454,414 | A | * | 6/1984 | Benton | G07F 7/0866 235/379 |
| 4,523,087 | A | * | 6/1985 | Benton | G06Q 20/341 235/379 |
| 4,575,621 | A | * | 3/1986 | Dreifus | G06K 7/1097 235/380 |
| 4,689,478 | A | * | 8/1987 | Hale | G06Q 20/341 235/375 |

(Continued)

FOREIGN PATENT DOCUMENTS

WO WO2015164521 A1 * 10/2015 ......... H04L 63/0428

*Primary Examiner* — Daniel S Felten
(74) *Attorney, Agent, or Firm* — Craig J. Lervick; Larkin Hoffman Daly & Lindgren Ltd.

(57) ABSTRACT

A user is able to access multiple accounts located at and/or managed by different organizations, by providing secure exchanges of necessary information so that multiple login details are not necessary. The system coordinates activities between several entities using a communication manager which is configured to manage communication protocols, security and necessary interface requirements so the user can securely access the desired accounts. In addition, the communication manager will include various levels of security measures, including encryption, transaction verification, etc. By managing these details within the communication manager, the user will not need to provide multiple PIN numbers or access codes each time a transaction is desired.

18 Claims, 2 Drawing Sheets

(56) References Cited

U.S. PATENT DOCUMENTS

| | | | | | |
|---|---|---|---|---|---|
| 4,837,422 | A | * | 6/1989 | Dethloff | G06K 7/006 235/375 |
| 5,884,271 | A | * | 3/1999 | Pitroda | G06Q 20/02 705/2 |
| 6,068,183 | A | * | 5/2000 | Freeman | G06K 19/0723 235/375 |
| 6,769,607 | B1 | * | 8/2004 | Pitroda | G06K 7/0013 235/380 |
| 7,308,426 | B1 | * | 12/2007 | Pitroda | G06Q 20/04 705/14.27 |
| 7,366,990 | B2 | * | 4/2008 | Pitroda | G06F 3/0483 715/745 |
| 7,704,145 | B2 | * | 4/2010 | Glisson | G06Q 20/207 273/138.1 |
| 8,753,194 | B2 | * | 6/2014 | Schneider | G06Q 40/123 463/25 |
| 9,514,327 | B2 | * | 12/2016 | Ford | G06F 16/93 |
| 2015/0058277 | A1 | * | 2/2015 | Ioannidis | G06Q 50/01 706/52 |
| 2015/0310188 | A1 | * | 10/2015 | Ford | H04L 63/0428 726/28 |
| 2015/0339667 | A1 | * | 11/2015 | Dua | G06Q 20/20 705/16 |
| 2017/0041296 | A1 | * | 2/2017 | Ford | H04W 12/06 |

\* cited by examiner

SYSTEM FOR COORDINATING ACCESS TO MULTIPLE ACCOUNTS USING A SINGLE ACCESS CARD

BACKGROUND

In today's society, cards are used to access many types of accounts and programs. Some examples include cards used to access bank accounts, credit accounts, rewards programs, loyalty programs etc. In many cases, information stored on the card (i.e. in the magnetic strip or chip) is used to provide a link to a particular account. Using the typical credit card as an example, information stored on the card allows card processing systems to access the appropriate financial institution, and specific account, maintained or held by the card holder. In this manor, financial transactions are greatly simplified and accommodated. That said, multiple levels of security and data protection are also provided on the credit card and in the related processing systems, using encryption and other data protection mechanism. Similar protection mechanisms are provided for banking cards, prepaid cards, and other financial cards.

Another area where such cards are used for many programs is in the customer loyalty environment. Here, the information on the card links a user to a loyalty account where a user may accumulate miles, points, rewards, etc. Those skilled in the art will recognize that these loyalty awards can take on many forms, including programs where a customer will achieve cash back, airline miles, points, free meals, merchandise, etc. In a similar situation, player cards are very popular in the casino and gaming environment, used to track player activity and results.

As well known to many individuals, it is easy to accumulate a wide array of cards for many different purposed. Unfortunately, this creates clutter and confusion for many, since there is a need to carry all of these cards, remember passwords and/or PIN numbers, and remember certain details for all of these different programs.

SUMMARY

To increase convenience for individuals, a system that coordinates access to multiple accounts is provided which securely exchanges necessary information so that multiple login details are not necessary. In some embodiments, the system coordinates between several entities using a communication manager which is configured to manage communication protocols and necessary interface requirements. In addition, the communication manager will include various security measures, including encryption, transaction verification, etc. By managing these details within a communication manager, the user will not need to provide multiple PIN numbers or access codes each time a transaction involving a different account is desired.

In one particular embodiment, the multi-account access system is implemented in a casino environment so users have easy access to resources when desired. This is also an environment where loyalty cards are frequently used, thus providing the desired coordination between loyalty accounts and financial accounts is particularly beneficial.

BRIEF DESCRIPTION OF THE DRAWINGS

Further objects and advantages of the invention set forth in the claims can be seen by reviewing the following detailed description, in conjunction with the drawings, in which:

DETAILED DESCRIPTION

In order to provide more convenience and additional options for card holders, the systems further outlined below provide mechanisms which allow a card holder to access multiple accounts using a single card. More particularly, the systems and mechanisms allow access to accounts of many different types, and accounts maintained or supported by many different organizations, using a single card. Mechanisms are also provided to embed the necessary information into a single card (i.e. within the magnet strip or chip contained on the card) to accommodate access to multiple accounts. This will typically include multiple account numbers and related information regarding the type of accounts involved, thus allowing considerable amounts of flexibility and freedom for the user. Furthermore, mechanisms are provided in the related systems, such as point of sale devices, card readers, card processing systems, etc. so the multiple accounts will be recognized. Upon recognition that the card supports multiple accounts, the related systems will then prompt a user to carry out appropriate actions, such as selecting the desired account and desired action. As one example, after information on the card has been read, the user may be prompted to select from a credit account, a prepaid account, or a loyalty program to process the contemplated transactions. In each of these situations, the user is provided with considerable amounts of flexibility and many options, using one particular card.

Figure 1:
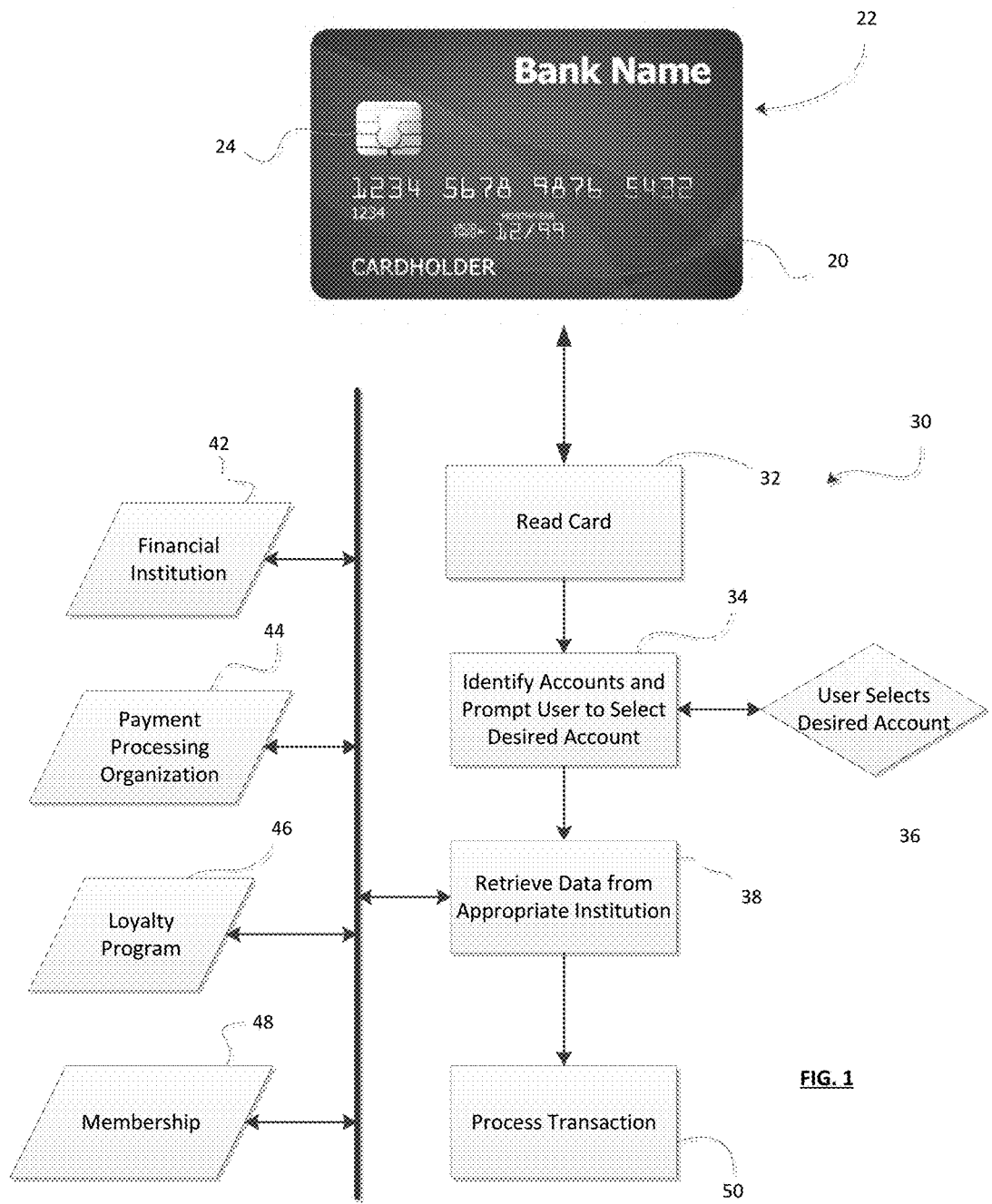
FIG. 1 is a schematic illustration of a multi account access card system.

Referring now to FIG. 1, a schematic illustration of one potential use for the multi account access card system is illustrated. In this particular example, a bank card 20 is illustrated as one example of the possible card type. As is well recognized, bank card 20 will typically include an account number 22 and other identifying information. In this particular example, bank card 20 also includes a chip 24 which is specifically designed to carry information, including security mechanisms and account information. As will be also recognized by those skilled in the art, bank card 20 also typically includes a magnetic strip (not shown) on the back side which also carries information. Although the bank account number 22 is readily visible on the front side, information carried by chip 24 and the magnetic strip also provide the ability to enable additional features and options for a user, thus providing the additional features contemplated by the present systems.

As discussed above, bank card 20 illustrated in FIG. 1 includes both chip 24 and a magnetic strip (not shown, but understood to exist on the back of card 20). Both of these elements are used for data storage purposes, and can be read by the related card processing systems. Although having both of these elements on the card provides certain benefits, it should be understood that the present systems and mechanisms are operable using either one of the data storage mechanisms alone. It is contemplated that card 20 may include only the magnetic strip, or may include only chip 24, or may include both of these data storage elements.

In the present example system, bank card 20 is the tool utilized to initiate various transactions. In this process, the bank card 20 will be presented to a merchant or organization combination which has the ability to read the card, and process all additional information. In the process illustrated, card 20 is first read at step 32 to identify all relevant information carried thereon. Next, the system will process the retrieved information, determine or identify all relevant account information, and prompt the user to select a desired account. As one example, the card may contain information related to a banking account and a payment processing account (e.g. PayPal™ or E-Pay™). At step 36 the user will select the desired account to be used, thus further instructing the system to process information accordingly. Next, at step 38, the system will retrieve data from the appropriate institution as necessary. As illustrated, the data sources 40 may include financial institution data 42, payment processing organization information 44, loyalty program data 46, or membership information 48. Naturally, other examples are possible. Once the information is retrieved, the transaction can thus be appropriately processed at step 50.

Although not specifically illustrated in FIG. 1, it will be understood that the systems and mechanisms both on card 20, and within processing systems (not shown in FIG. 1) will include various levels of security and data protection. This will necessarily include appropriate data transfer protocols, encryption mechanisms, password protections, and other security measures.

As an additional example, the card systems and mechanisms described here are particularly beneficial in the gaming environment. As is well known, and expected by gaming customers, player tracking cards provide many benefits and additional "perks" that enhance the gaming experience. In most instances, a player tracking card is issued to a customer which can then be inserted into special card readers throughout a casino. When player tracking cards are used, the player will accumulate points, prizes, credits, and other benefits based upon many different criteria (i.e. the amount of time spent playing certain games, the wagering patterns of the user, random drawings of players, etc.). The benefits and possible additional payouts provided to the user create additional levels of satisfaction and excitement. That said, the current systems do require the player to maintain a separate player tracking card, which is not necessarily "attached" or coordinated with other cards.

In an casino environment, a single card can be used with additional information stored thereon. For example, a player tracking card may have information related to a player tracking account, and information related to a payment account (i.e. E-pay account, in-house account, etc.). thus allowing for both the payment of wagers, and carrying out typical player tracking activities. Yet further, the player tracking card may provide appropriate information to access a debit account at one of the player's financial institutions. Alternatively, the player tracking information could be added to a credit card, thus allowing for the use of the single card to perform player tracking activities and payment activities. By providing this wide access to various accounts using a single card, player convenience is greatly enhanced.

It should be noted that any number of accounts could be linked to or correlated with a single card using the appropriate systems and mechanisms generally outlined above. In an additional example, this could include a single credit card linked to the financial institution which backs the credit provided, linked to an electronic payment account, and also linked to multiple loyalty programs. When such a card is used in a payment transaction, the user will be prompted to select which of these several accounts they wish to use, thus allowing multiple levels of payment options to the user (e.g. pay with credit, pay with loyalty points, pay with electronic payment account, etc.).

As suggested above, the systems and mechanisms used will include several levels of security. In addition, due to the diverse nature of the accounts involved, it will be necessary to have an overall account management tool, which will accommodate all necessary data transfer protocols, in addition to the levels of security involved. Using such a system however, each account is separately protected, since the management system will simply be cooperating with the systems managed by the account holders (e.g. bank systems, e-payment systems, credit systems, loyalty program systems, player tracking systems, etc.).

While the illustration of FIG. 1 generally contemplates the processing of a "transaction" it will be understood that this could include many types of exchanges, transfers, payments, adjustments, etc. Naturally, payment transaction and or financial transactions are clearly contemplated amongst various types of accounts. Further, loyalty based transactions (i.e. redemption of points, miles, or other credits) could also easily be carried out. In addition, a transaction may involve the acquisition or purchasing of "points" thus adding further value to the loyalty programs in which a user is involved. This is all made possible by the appropriate storing of information on the card itself, and the related systems which provide the desired levels of coordination.

Figure 2:
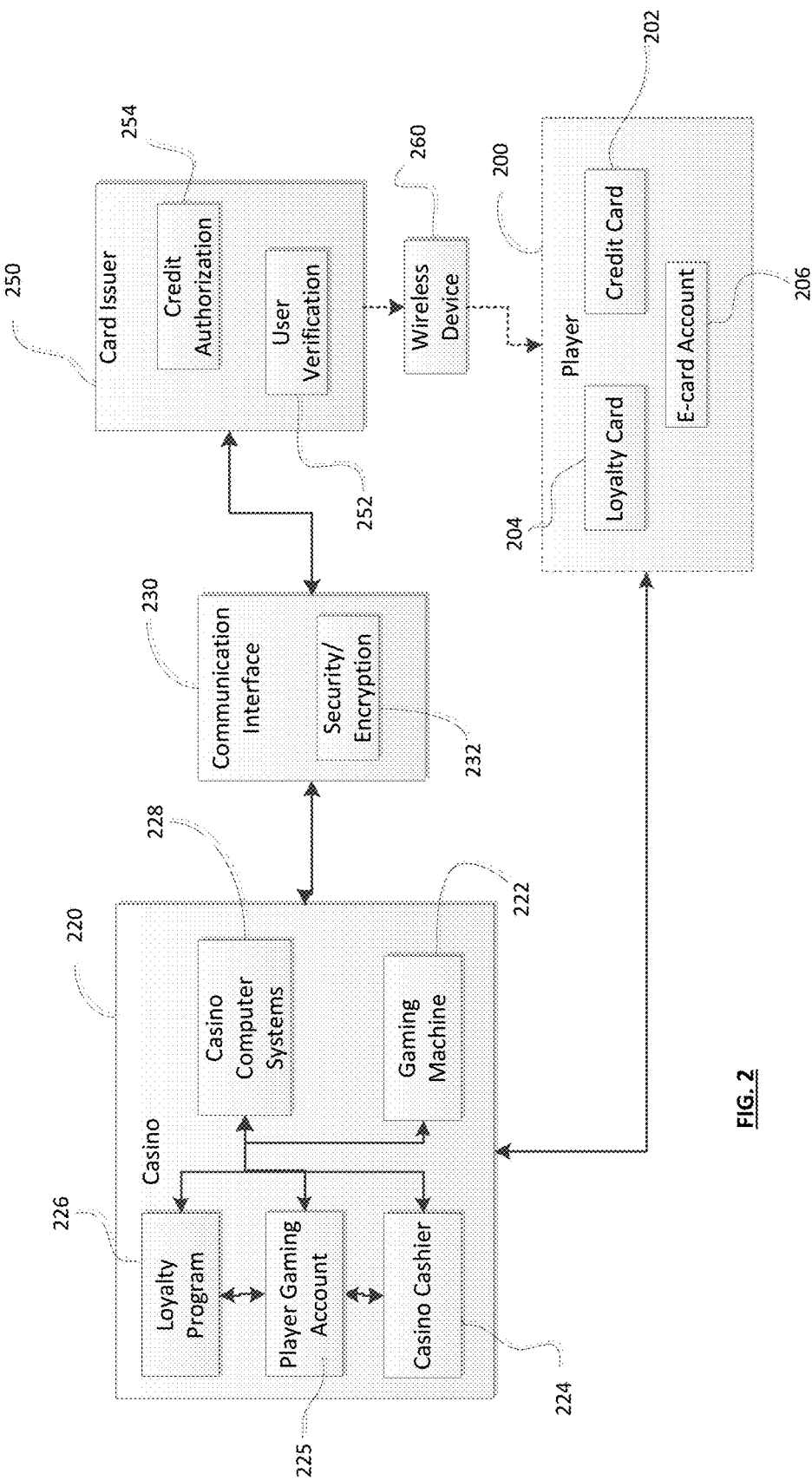
FIG. 2 is schematic illustration of the system architecture implementing the multi account access card system.

As suggested above, the present system and method provides mechanisms for users to uniformly access several types of accounts. Turning now to FIG. 2, one example is illustrated where a credit account is accessible by a player in a casino environment. As will be recognized, this system is applicable and useable but many different locations by multiple users and coordinating with multiple card issuers. For example, a similar system could be implemented at many facilities in the travel industry, coordinating access based on loyalty cards and/or credit cards. Examples include hotels, rental car facilities, and airlines. Further, additional safeguards or protections can be included to ensure security, proper data handling, and adherence to various regulations related to credit access.

As illustrated in FIG. 2 which specifically outlines the use of the system in a casino environment, a player 200 typically has access to credit cards 202, loyalty cards 204 and e-card account details 206. Where appropriate, other types of cards may be utilized to provide identification and appropriate designations, such as a membership card, etc. In the present system, these cards are primarily utilized to provide identification and appropriate information to a casino 220. In this example, casino 220 will include a central casino computer system 228 which is configured and programmed to coordinate several operations. In addition, casino 220 will include gaming machines 222, a casino cashier 224, and a loyalty program database 226. As will be appreciated, these systems and devices allow for the storage and communication of vast amounts of information. Additionally, these systems and devices provide for the coordination of necessary communications, and allow for the correlation between various types of accounts. As mentioned above, the casino 220 will provide the ability for correlation between loyalty cards and appropriate credit accounts for a particular user. In this manor, additional flexibility is provided for all.

In one particular example, a player may desire to access additional credit while at gaming machine 222. As will likely be anticipated, player 200 typically will provide loyalty information to the gaming machine via a loyalty card, or other identifying information, thus allowing casino computer systems 228 to access additional information related to the player. Upon receipt of a credit request from player 200, casino computer systems 228 will utilize a communication interface or account management system 230, to access a financial institution or card issuer 250 so that the desired transaction can be accommodated. As will be appreciated, Account management system 230 will operated as a desired interface between multiple systems, and will include necessarily security and encryption provisions 232 to maintain security of all information. In the present example, a credit request is presented to card issuer 250 which includes identifying information and an amount designation. Upon a receipt of this information, the card issuer (i.e. financial institution) can then perform necessary verifications and processes to accommodate the desired credit request. Although this may take many forms, a user verification 252 will typically be required, along with an appropriate credit authorization process 254. To provide additional security, an additional verification process with the player may be necessary. For example, this may involve receiving authorization via a wireless communication device 260, confirming that the desired credit request is actually coming from the player.

Further, assuming the credit authorization has been approved, the system illustrated in FIG. 2 further accommodates communication back to casino 220, thus allowing the approved amounts to be transferred to the appropriate accounts. In this particular example, the approved amount will be transferred to player account 225, which could then be accessed by various systems within casino 220.

In addition to the details outlined above, account management system 230 could also include player controls or limits to prevent abuse and overspending. Clearly, this is a personal choice of the user, but overall controls could be incorporated at this point since the communication interface 230 is uniquely position to oversee multiple transactions.

The above outlined system and process can be uniquely applied to credit transactions, which have not traditionally been used in the casino environment. The additional requirements for credit authorization and related security make this somewhat more complicated. However, various authorization and verification processes can certainly accommodate these processes. In addition, from the financial institution perspective, it is more straightforward, and less cash intensive to utilize credit accounts or credit cards. The credit cards contemplated may include classic credit card, as are well recognized in the industry, general purpose reloadable credit cards, or other types of credit accounts. Financial institutions appreciate and recognize the benefit of utilizing these accounts since lower capitalization requirements exist, and transaction processing is generally well accepted.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A system providing coordinated access to multiple accounts supported by a plurality of account holding organizations, comprising:
 a passive card having at least one non-volatile data storage mechanism supported thereon, wherein the at least one non-volatile data storage mechanism maintains data related to at least one of a plurality of accounts;
 a card reader configured to receive the passive card and read information stored in the at least one non-volatile data storage mechanism; and
 an account management system in communication with the card reader configured to receive the read information and recognize the plurality of accounts tied to the passive card within the account management system, the account management system having communication mechanisms to communicate with the account holding organizations comprising a financial institution and a loyalty program, wherein such communication mechanisms will allow a user to securely access any selected one of the multiple accounts, wherein the secure access is achieved by at least one level of security.

2. The system of claim 1 wherein the passive card is a credit card and the at least one data storage mechanism is a microchip.

3. The system of claim 1 wherein the passive card is a credit card and the at least one data storage mechanism is a magnetic strip carried on the passive card.

4. The system of claim 1 wherein the passive card is a loyalty card which contains information necessary to access a loyalty account.

5. The system of claim 1 wherein the account management system requires encryption for all communication.

6. The system of claim 5 wherein the account management system further requires at least one account verification step prior to communicating with the account holding organizations.

7. The system of claim 6 wherein the card reader cooperates with a merchant system when the user is attempting to access accounts while at the merchant's location, and wherein the account management system will receive information from the card reader via the merchant system.

8. The system of claim 7 wherein the merchant is a casino and the user is attempting to access accounts while at the casino.

9. The system of claim 8 wherein the use of a loyalty card at the casino will allow access to a financial account at the financial institution based upon predetermined information contained within account management system.

10. A system providing coordinated access to multiple accounts supported by a plurality of account holding organizations, comprising:
 a passive card having at least one non-volatile data storage mechanism supported thereon, wherein the at least one non-volatile data storage mechanism maintains data related to a user and to least one of a plurality of accounts held by the user;
 a card reader operating in conjunction with a merchant computing system, wherein the card reader is configured to receive the passive card and read information stored in the data storage systems, and to provide selected information to the merchant; and
 an account management system in communication with the merchant computing system and a plurality of account holding organizations which comprise a financial institution and a loyalty program, the account management system configured to recognize that the passive card is tied to the multiple accounts, the account management system further having communication mechanisms comprising at least one level of security to securely communicate with the plurality account holding organizations supporting the multiple accounts, thus allowing the user to be able to securely access any selected one of the multiple accounts, the account management system incorporating at least one level of security in all communications with the account holding organizations to prevent unauthorized access to any one of the multiple accounts.

11. The system of claim 10 wherein the merchant computing system is associated with a casino and the account holding organization is a financial institution, such that a user is able to access multiple financial accounts held by the financial institution while at the casino.

12. The system of claim 11 wherein the card is a casino loyalty card and the user is able to access the multiple financial accounts using only the loyalty card.

13. The system of claim 10 wherein the communication mechanisms include encrypted communication using a predetermined encryption scheme, and wherein the merchant computing system, account management system and systems within the account holding organization are all configured to utilize a predetermined communication protocol.

14. The system of claim 13 wherein the merchant computing system is associated with a casino and the account holding organization is a financial institution, wherein a user, using only a casino loyalty card, can access multiple financial accounts held by the user's financial institution while at the casino.

15. A system providing coordinated access to multiple accounts supported by a plurality of account holding organizations, comprising:

a card having at least one data storage mechanism supported thereon, wherein the data storage mechanism maintains data related to at least one of a plurality of accounts;

a card reader configured to receive the card and read information stored in the data storage systems; and an account management system in communication with the card reader configured to receive the read information and recognize the plurality of accounts tied to the card within the account management system, the account management system having communication mechanisms to communicate with the account holding organizations comprising a financial institution and a loyalty program, wherein such communication mechanisms are encrypted and use at least one level of security to allow a user to securely access any selected one of the multiple accounts, wherein the secure access is achieved by at least one level of security comprising at least one account verification step;

wherein the card reader cooperates with a casino system when the user is attempting to access accounts while at a casino, and wherein the account management system will receive information from the card reader via the merchant system.

16. The system of claim 15 wherein the use of a loyalty card at the casino will allow access to a financial account at the financial institution based upon predetermined information contained within account management system.

17. The system of claim 15 wherein the card is a credit card and the data storage system is a microchip.

18. The system of claim 15 wherein the card is a credit card and the data storage system is a magnetic strip carried on the card.

* * * * *